(12) United States Patent
Chao et al.

(10) Patent No.: US 7,606,724 B2
(45) Date of Patent: Oct. 20, 2009

(54) DEMAND DISPATCH SYSTEM AND METHOD

(75) Inventors: Jen-Lin Chao, Hsinchu (TW);
We-Liang Yen, Hsinchu (TW);
Fa-Liang Wang, Hsinchu (TW);
Chen-Wei Hsu, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 1146 days.

(21) Appl. No.: 10/646,179

(22) Filed: Aug. 22, 2003

(65) Prior Publication Data
US 2005/0043981 A1    Feb. 24, 2005

(51) Int. Cl.
*G05B 19/418*    (2006.01)
(52) U.S. Cl. .......................................... 705/8
(58) Field of Classification Search ........ 705/8
See application file for complete search history.

(56) References Cited

U.S. PATENT DOCUMENTS

| | | | | |
|---|---|---|---|---|
| 5,255,197 | A * | 10/1993 | Iida | 700/108 |
| 5,268,838 | A * | 12/1993 | Ito | 700/99 |
| 5,818,716 | A * | 10/1998 | Chin et al. | 700/100 |
| 5,819,232 | A * | 10/1998 | Shipman | 705/8 |
| 5,943,484 | A * | 8/1999 | Milne et al. | 700/100 |
| 6,006,192 | A * | 12/1999 | Cheng et al. | 705/7 |
| 6,049,742 | A * | 4/2000 | Milne et al. | 700/99 |
| 6,253,187 | B1 * | 6/2001 | Fox | 705/10 |
| 6,272,389 | B1 * | 8/2001 | Dietrich | 700/101 |
| 6,463,345 | B1 * | 10/2002 | Peachey-Kountz et al. | 700/99 |
| 6,604,089 | B1 * | 8/2003 | Van Horn et al. | 705/26 |
| 6,671,673 | B1 * | 12/2003 | Baseman et al. | 705/7 |
| 7,085,730 | B1 * | 8/2006 | Tsao et al. | 705/10 |
| 7,298,507 | B2 * | 11/2007 | Takao et al. | 358/1.15 |
| 7,379,922 | B2 * | 5/2008 | Pericle | 705/400 |
| 7,487,107 | B2 * | 2/2009 | Blanchard et al. | 705/10 |
| 2001/0037282 | A1 * | 11/2001 | Yoneda | 705/37 |
| 2002/0019761 | A1 * | 2/2002 | Lidow | 705/10 |
| 2003/0050817 | A1 * | 3/2003 | Cargille et al. | 705/8 |
| 2003/0229526 | A1 * | 12/2003 | Gallacci et al. | 705/7 |

(Continued)

FOREIGN PATENT DOCUMENTS

TW    484071    4/2002

(Continued)

OTHER PUBLICATIONS

James Jones, "Math 160-Finite Mathematics", Jun. 16, 2003 [retrieved Nov. 29, 2007], pp. 1-5, retrieved from Google.com and www.richland.edu/james/summer03/m160/.*

(Continued)

*Primary Examiner*—Scott L Jarrett
(74) *Attorney, Agent, or Firm*—Thomas, Kayden, Horstemeyer & Risley (57) ABSTRACT

A demand dispatch system to provide stable fabrication loading. The system includes a risk database recording risk information for a demand and an allocation planning module. The allocation planning module receives the demand, divides the demand into a low risk demand and a high risk demand according to the risk information, and then determines an expected quantity for a fabrication. The allocation planning module dispatches parts of the low risk demand and the high risk demand to the fabrication according to the expected quantity and the risk information.

18 Claims, 7 Drawing Sheets

U.S. PATENT DOCUMENTS

2005/0038684 A1* 2/2005 Wang et al. ............... 705/8

FOREIGN PATENT DOCUMENTS

TW 533363 5/2003

OTHER PUBLICATIONS

Connors, D.P. and Yao, D.D. "Methods for Job Configuration in Semiconductor Manufacturing", IEEE Transactions on Semiconductor Manufacturing, Aug. 1996, vol. 9, No. 3, pp. 411.*

Feigin, G.E.; Katircioglu, K.; Yao, D.D., "Capacity allocation in semiconductor fabrication," Decision and Control, 1999. Proceedings of the 38th IEEE Conference on , vol. 2, No., pp. 1374-1379.*

Hood, S.J.; Bermon, S.; Barahona, F., "Capacity planning under demand uncertainty for semiconductor manufacturing," IEEE Transactions on Semiconductor Manufacturing, May 2003, vol. 16, No. 2, pp. 273-280.*

Cakanyildirim, M. and Roundy, R. SeDFAM: Semiconductor demand forecast accuracy model, IIE Trans 34(5) (2002), 449-465.*

Tamura, Takayoshi et al., Designing customer oriented production planning system (COPPS) International Journal of Production Economics, vol. 41, 1995.*

Leachman, Robert C. et al., IMPReSS: An Automated Production Planning and Delivery Quotation System at Harris Semiconductor Corporation—Semiconductor Section, Interfaces, Jan.-Feb. 1996, vol. 26, No. 1.*

Karabuk, Suleyman, Coordinating Capacity Decisions For The Supply Chain In High-Tech Industry Lehigh University, Sep. 2001.*

Bermon, Stuart et al., Capacity Optimization Planning System (CAPS) Interfaces, Sep.-Oct. 1999, vol. 29, No. 5.*

* cited by examiner

DEMAND DISPATCH SYSTEM AND METHOD

BACKGROUND OF THE INVENTION

1. Field of the Invention

The present invention relates to supply chain management, and particularly to a demand dispatch system and method for supply chain management.

2. Description of the Related Art

In the supply of goods, supply chain encompasses purchase of materials, transformation of these materials into intermediate and finished products, and the distribution of finished products. In the supply chain, customers transmit requests (or demands) that may include a request for a particular quantity of a product by a specific date. The manufacturer plans its schedule according to these received requests to satisfy each customer.

The complexity of the chain may vary greatly from industry to industry and firm to firm. For example, demand and capacity management is critical in integrated circuit (IC) foundries to reduce inventory and increase productivity, particularly since the manufacturing process of each IC product is complicated, IC products do not use routine materials, and the cost of wafers and capacity is relatively high.

The key issue in supply chain management is fulfillment of customer demands and guarantee of delivery date when the foundry fully loaded. In practice, however, since the foundry is always under loaded, cost management becomes an important issue (for the management of supply chain functions and operations) to strengthen competitive ability.

Since the IC industry is characterized by high variation, wafer and capacity costs are higher. In addition, products are not routine material, that is, the short life cycle, prompt delivery, and quantity management are all critical in reducing costs. Customers endeavor to control delivery date and quantity through planning and forecasting. Wishing to construct a virtual factory to lower the impact of marketing shifts, and reduce the cost of maintaining capacity, customers frequently overestimate demand in order to meet capacity, and the foundry consequently frequently over-commits in order to reduce order and capacity loss. Since the foundry must prepare capacity and related materials for customer demands in advance, this discrepancy between customer and foundry goals and methods has become a major problem in supply chain management, resulting in impacted cost management.

For a foundry having several fabrications, the best cost management method is to maintain a stable prepared capacity exceeding customer demand for each fabrication. Unfortunately, there is no effective dispatch mechanism provided by current supply chain management applications to smooth loading, and accomplish optimized cost management.

SUMMARY OF THE INVENTION

Accordingly, an object of the invention is to provide a demand dispatch system and method that provides stable fabrication loading.

Another object of the invention is to propose an IC product and manufacturing method thereof.

To achieve the above and other objects, the invention is directed to novel systems and methods for overcoming conventional demand dispatch problems. In one embodiment, the demand dispatch system comprises a risk database and an allocation planning module. The risk database records risk information for a first demand. The allocation planning module receives the first demand, and then divides the first demand into a low risk demand having a first order rate and a high risk demand having a second order rate according to the risk information. Then, the allocation planning module determines an expected quantity of a first fabrication, and dispatches a first quantity of the low risk demand and a second quantity of the high risk demand to the first fabrication according to the expected quantity, and the first order rate and the second order rate for the low risk demand and the high risk demand respectively.

The allocation planning module further dispatches a third quantity of the low risk demand of a second demand dispatched to a second fabrication to the first fabrication if the difference between the expected quantity and the first quantity is exceeding a predetermined ratio of the expected quantity. The allocation planning module further monitors the variation in the first quantity of the low risk demand of the first fabrication, and dispatches a pilot order to the first fabrication if the variation in the first quantity of the low risk demand shows a downward trend In another embodiment, a method provides IC product manufacturing. First, a first demand for a first IC product is received. The first demand is divided into a low risk demand having a first order rate and a high risk demand having a second order rate. In addition, an expected quantity of a first fabrication is determined. Thereafter, a first quantity of the low risk demand and a second quantity of the high risk demand are dispatched to the first fabrication according to the expected quantity, and the first order rate and the second order rate for the low risk demand and the high risk demand respectively. Afterward, a purchase order for the first IC product is received, and the first IC product corresponding to the purchase order is manufactured in the first fabrication.

BRIEF DESCRIPTION OF THE DRAWINGS

The aforementioned objects, features and advantages of this invention will become apparent by referring to the following detailed description of the preferred embodiment with reference to the accompanying drawings, wherein.

DETAILED DESCRIPTION OF THE INVENTION

As summarized above, the present invention is directed to novel systems and methods for overcoming conventional demand dispatch problems.

Figure 1:
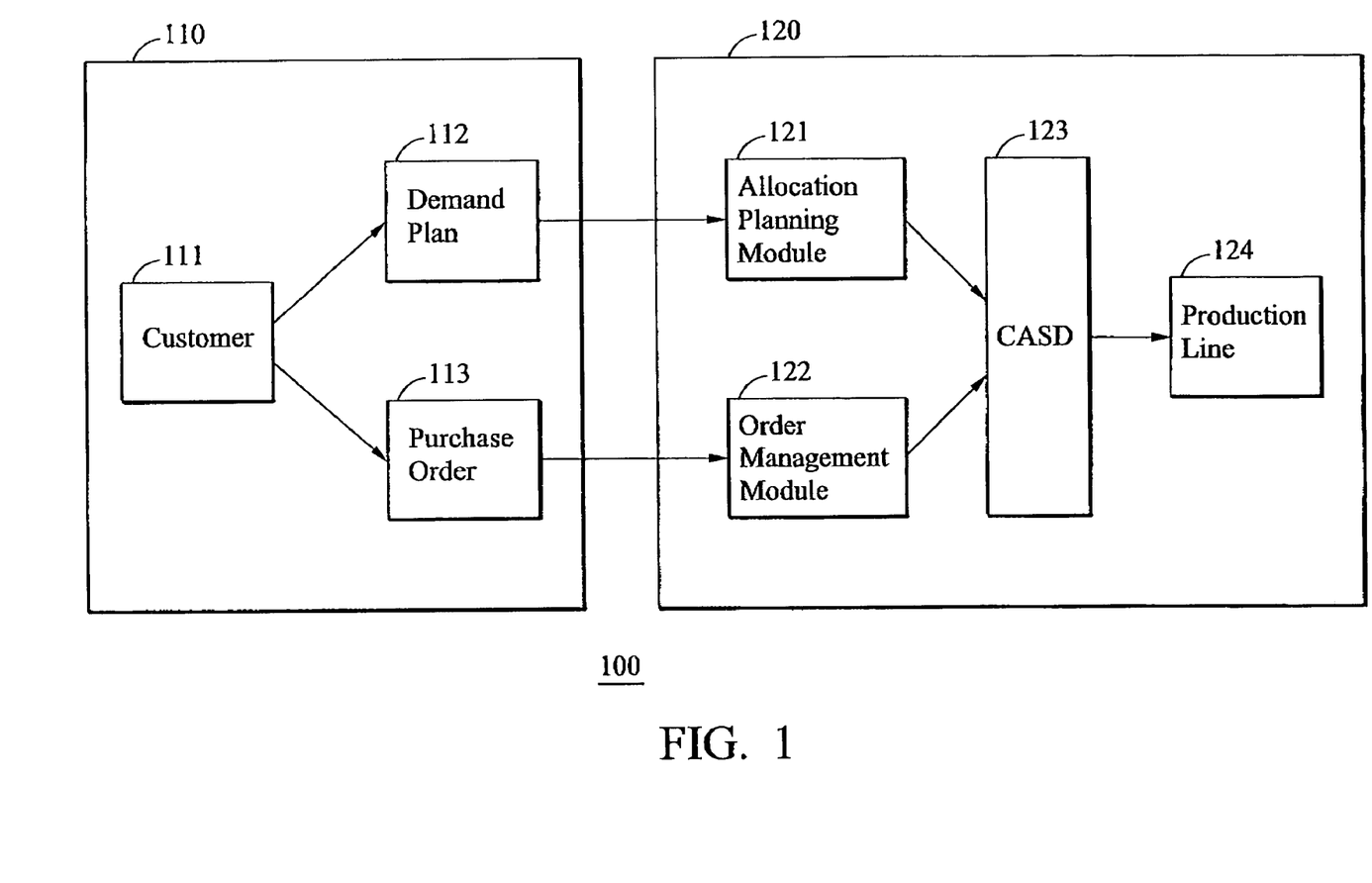
FIG. 1 is a schematic of the demand dispatch system according to the present invention.

FIG. 1 illustrates the architecture of the demand dispatch system according to an embodiment of the present invention. Note that IC products in an IC foundry are discussed in the embodiment, but the present invention can be applied to all factories.

The system 100 includes a customer side 110 and a manufacturer side 120. On the customer side 110, the customer 111 forecasts demand plan (demand) 112 and issues purchase order 113. The demand plan 112 and purchase order 113 are transferred to the manufacturer side 120. The demand plan 112 may include a request for a quantity of an IC product to a manufacturer (IC foundry). The purchase order 113 is an actual order that requests the manufacturer to start manufacturing the product.

On the manufacturer side 120, the allocation planning module 121 receives the demand plan 112 from the customer 111, manages the CASD (capacity available support demand) 123 of each fabrication according to the demand dispatching method of the present invention, and generates corresponding allocation plans accordingly. The allocation plan may be the customer support plan for the product, and records rough capacity distribution (dispatching) and schedule for the product. The details of the demand dispatching of the allocation planning module 121 will be discussed later. The order management module 122 receives the purchase order 113 for the IC product from the customer 111, and arranges the CASD 123 to meet customer demand.

The allocation planning module 121 has a risk database recording risk information for each IC product. It should be noted that the risk information is dependent upon customers 111. Table 1 shows an example of the risk database.

TABLE 1

| Product Name | LRD | HRD | LRD Order Rate | HRD Order Rate |
|---|---|---|---|---|
| A | 70% | 30% | 90% | 40% |
| B | 60 | 40% | 80% | 30% |

In table 1, the risk database records risk information for products A and B corresponding to a customer. The risk information includes low risk demand (LRD) and high risk demand (HRD) rates indicating the risk of a demand. The LRD represents a part of the demand with low risk and the HRD represents a part of the demand with high risk, that is, the HRD may be overestimated. In addition, The LRD and HRD have an order rate respectively, and the order rate is the possibility of these becoming actual orders.

In this case, the demand for product A may have 70% LRD and 30% HRD, and the order rates for the LRD and HRD are 90% and 40% respectively. For product B, the demand may have 60% LRD and 40% HRD, and the order rates for the LRD and HRD are 80% and 30% respectively. It should be noted that the risk information can be collected and summarized by analyzing historical information for the demand plans and the purchase orders of each customer.

The allocation planning module 121 divides each received demand into a LRD and a HRD according to its corresponding risk information in the risk database. The allocation planning module 121 also determines an expected quantity of each fabrication. Note that the expected quantity can be determined manually or automatically adjusted to the foundry situation.

Figure 2:
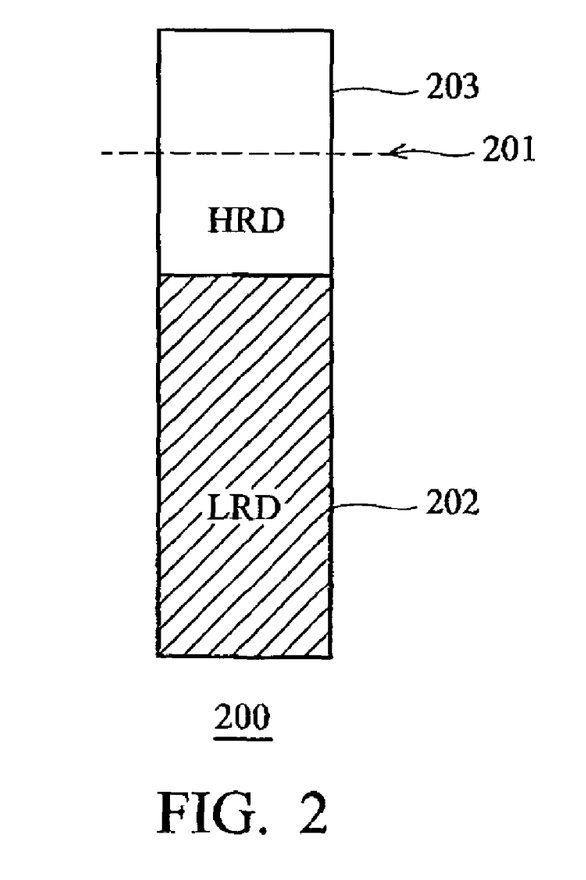
FIG. 2 is a schematic of a capacity available support demand (CASD) for a fabrication.

The allocation planning module 121 then dispatches the quantity of the LRD and that of the HRD to the fabrication utilizing a dispatching rule as follows:

$EQ=FQ*FOR+SQ*SOR$, in which EQ is the expected quantity, FQ is the quantity of the LRD, FOR is the LRD order rate, SQ is the quantity of the HRD, and SOR is the HRD order rate. It should be noted that FQ is less than or equal to the amount of the LRD, and SQ is less than or equal to the amount of the HRD. That is, a part or all of the LRD or HRD can be dispatched to the fabrication. FIG. 2 illustrates the CASD 200 for a fabrication using the dispatching rule. In this case, the dispatched CASD 200 includes LRD 202 and HRD 203, and the LRD 202 and HRD 203 can achieve the expected quantity 201 of the fabrication.

Figure 3:
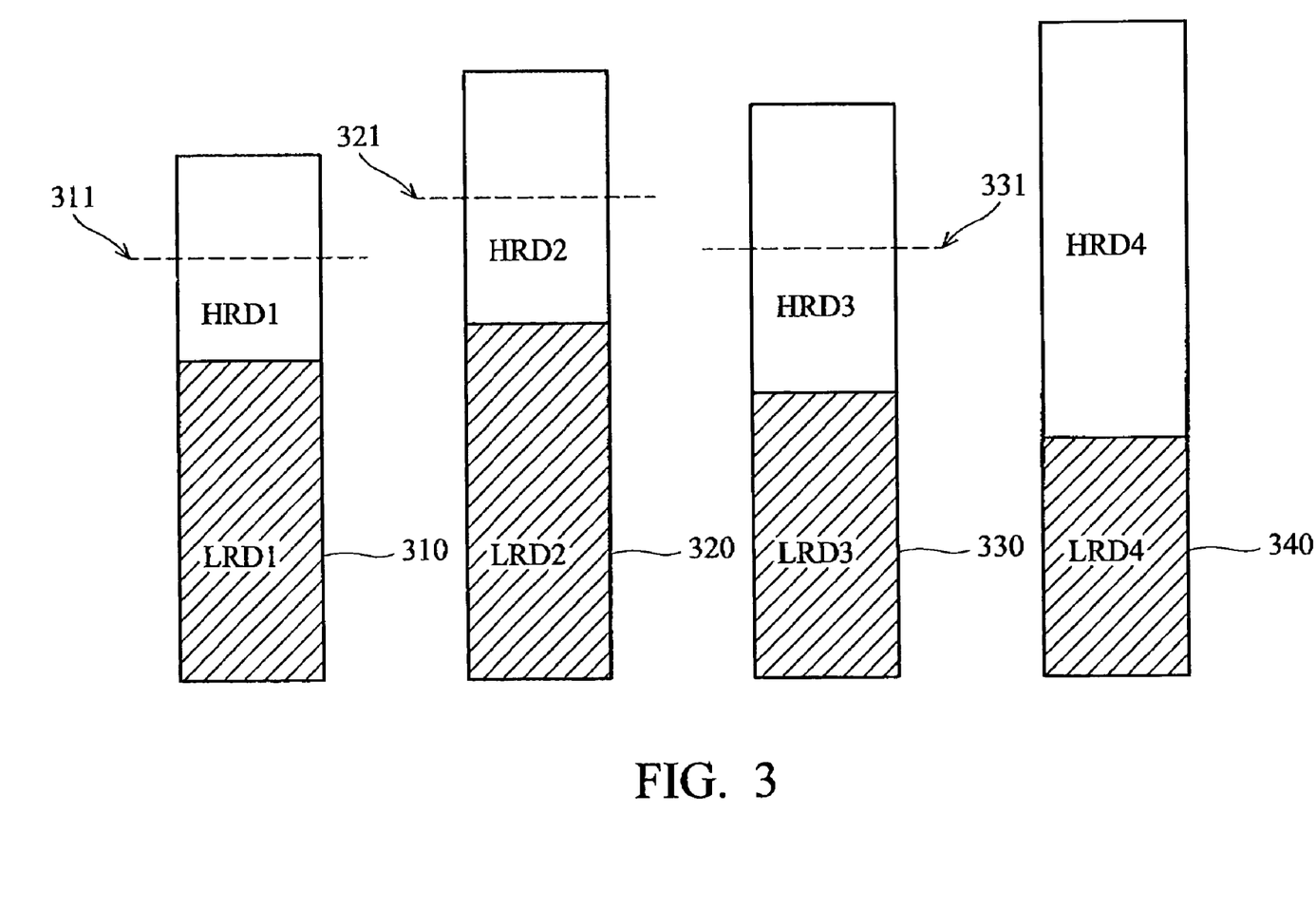
FIG. 3 is a schematic of the CASDs of several fabrications and a buffer fabrication.

In addition, the allocation planning module 121 may select a fabrication as a buffer to bear the risk of demands. The allocation planning module 121 may dispatch remnant HRD to the buffer fabrication. FIG. 3 illustrates the CASDs of several fabrications and the buffer fabrication. In this case, the CASDs (310, 320 and 330) of each fabrication can be dispatched according to the dispatching rule and its corresponding expected quantity (311, 321 and 331). The remnant HRD and LRD (HRD4 and LRD4) can be dispatched to the CASD 340 of the buffer fabrication. The allocation planning module 121 may monitor the quantity of the LRD of each fabrication, and re-dispatch the LRD (LRD4) of the buffer fabrication to the fabrication if the difference between the expected quantity and the quantity of the LRD of the fabrication is exceeding a predetermined ratio of the expected quantity, such as 20%.

Figure 4:
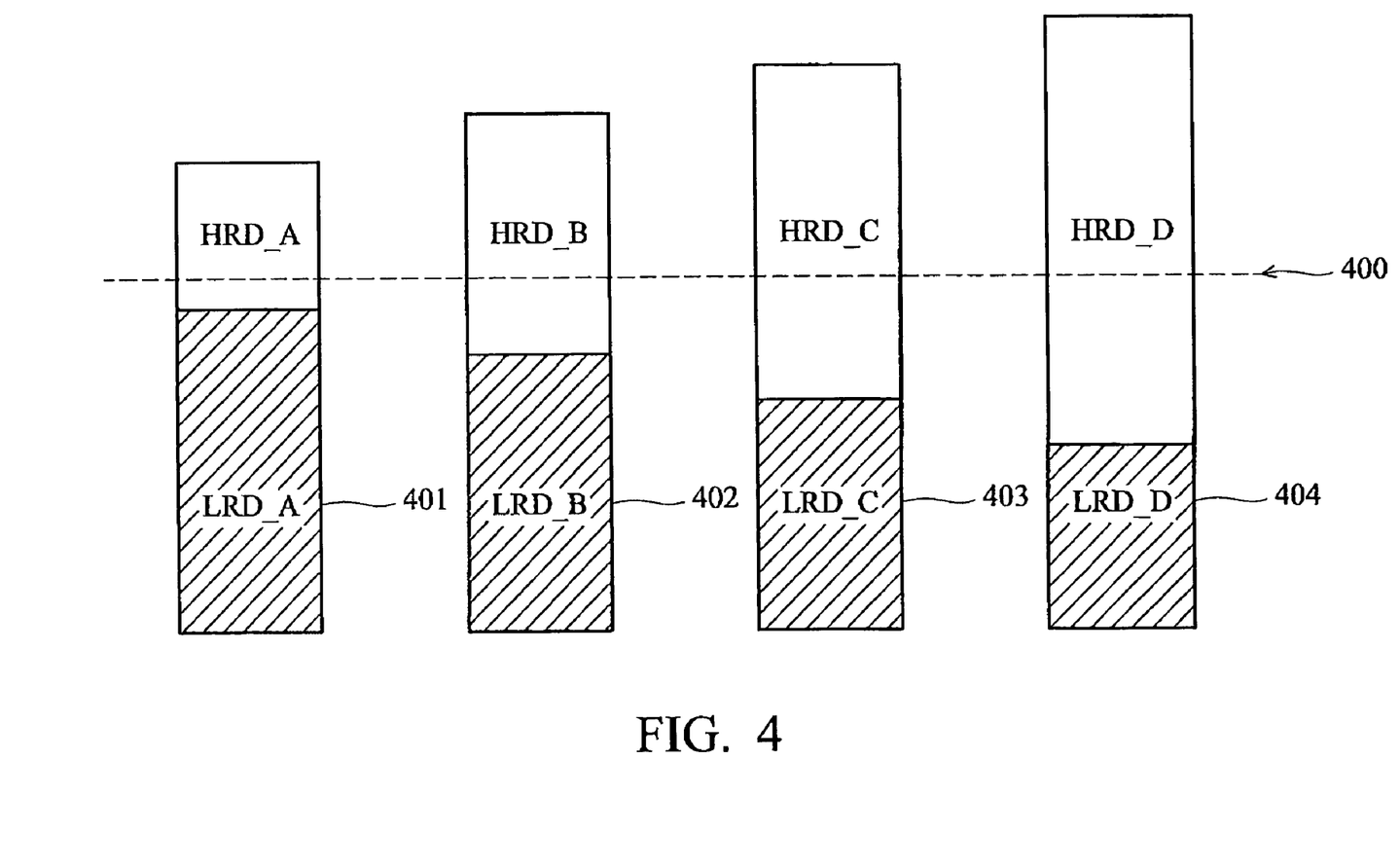
FIG. 4 is a schematic of monthly CASDs for a fabrication.

In addition, for long-term planning, the allocation planning module 121 may monitor variation in the LRD of each fabrication, and dispatch pilot orders to the fabrication if the variation in the quantity of the LRD of the fabrication shows a downward trend For example, FIG. 4 illustrates monthly CASDs for a fabrication, in which the CASD 401 of first month has LRD LRD_A, the CASD 402 of second month has LRD LRD_B, the CASD 403 of third month has LRD LRD_C, the CASD 404 of fourth month has LRD LRD_D, and the expected quantity of the fabrication is labeled 400. Since the quantity of LRD decreases successively, the allocation planning module 121 dispatches pilot orders to the fabrication. It should be noted that the pilot orders may be new tape out orders and may become potential orders of the fabrication.

Figure 5:
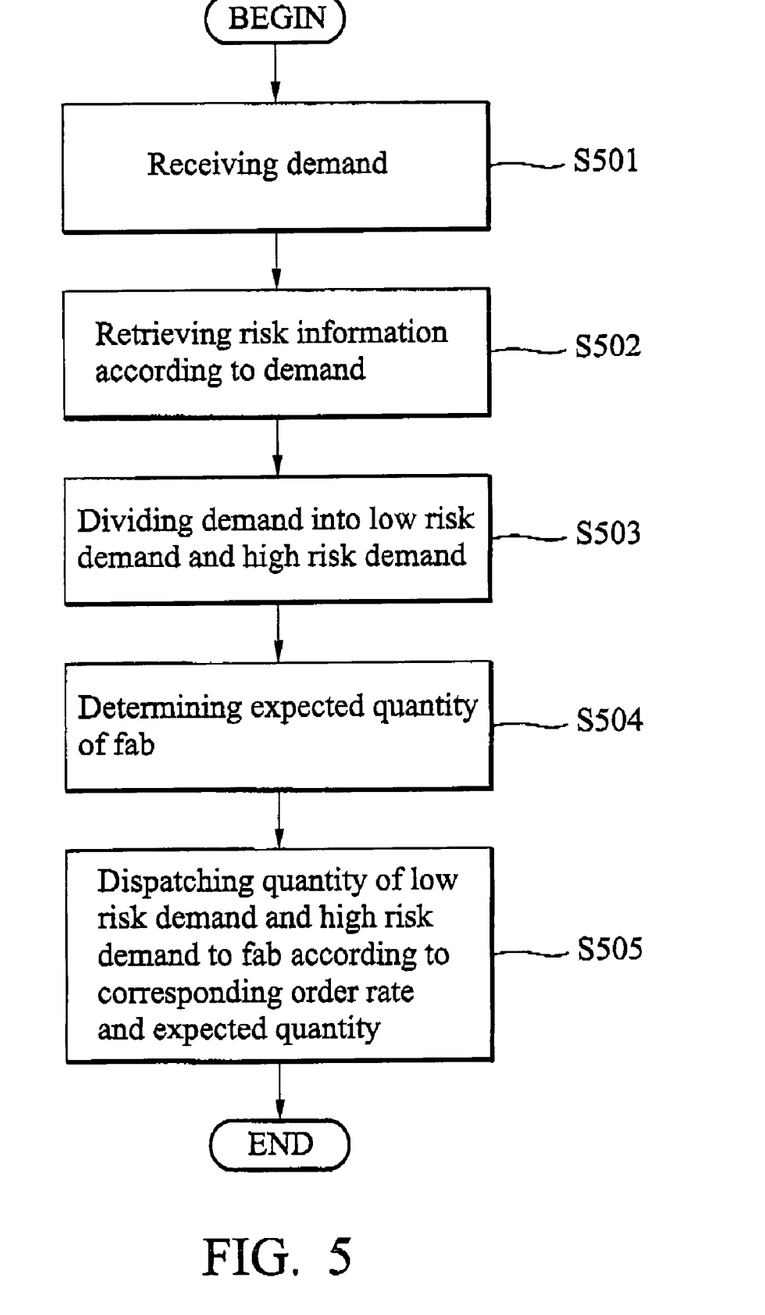
FIG. 5 is a flowchart of a process of the demand dispatching method according to the present invention.

FIG. 5 shows a process of the demand dispatching method according to the present invention.

First, in step S501, the allocation planning module 121 receives at least one demand for an IC product. Then, in step S502, the allocation planning module 121 retrieves the risk information from the risk database according to the IC product of the demand. Afterward, in step S503, the allocation planning module 121 divides the demand into a LRD and a HRD, in which the LRD and HRD have an order rate, respectively. Then, in step S504, the allocation planning module 121 determines an expected quantity for at least one fabrication.

Thereafter, in step S505, the allocation planning module 121 dispatches a first quantity of the LRD and a second quantity of the HRD to the fabrication according to the dispatching rule, the expected quantity, and the corresponding order rates for the LRD and the HRD respectively.

Figure 6:
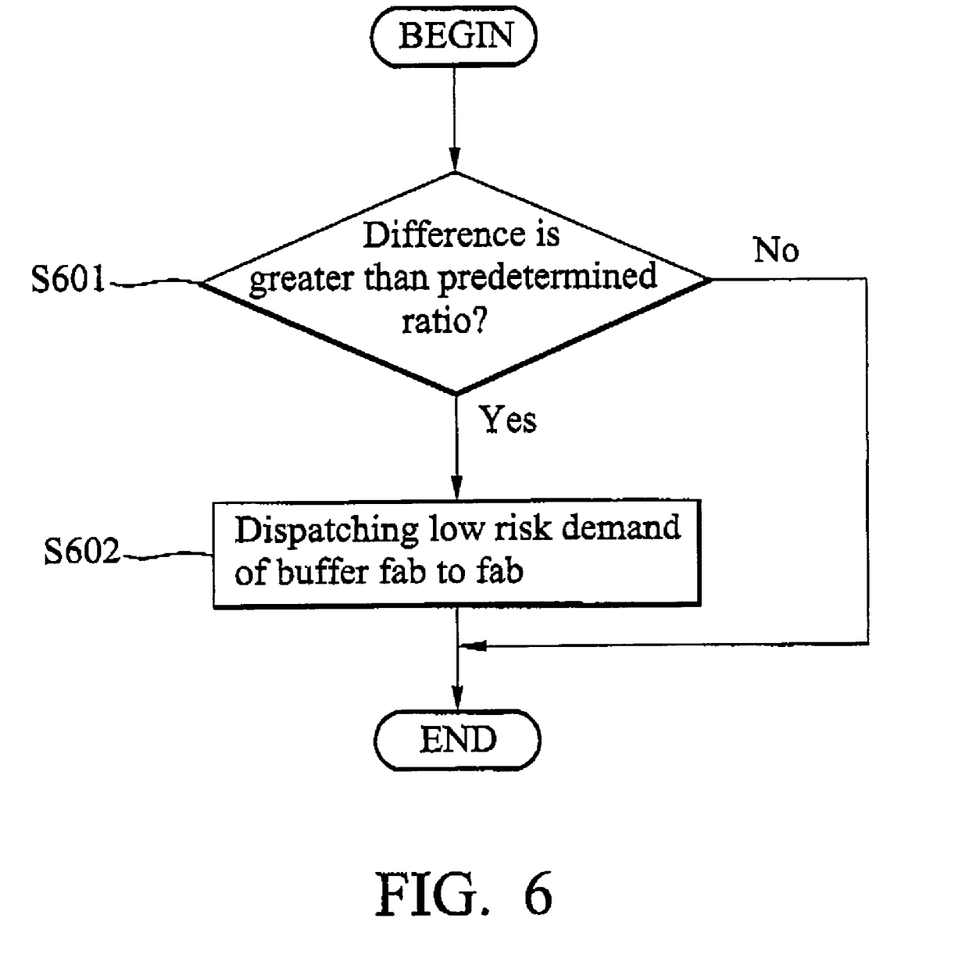
FIG. 6 is a flowchart of a process of short-term demand adjustment according to the present invention.

FIG. 6 is a flowchart showing the process of short-term demand adjustment according to the present invention. First, in step S601, the allocation planning module 121 checks whether the difference between the expected quantity and the quantity of the LRD of the fabrication is exceeding a predetermined ratio of the expected quantity. If so, in step S602, the allocation planning module 121 dispatches the LRD of the buffer fabrication to the fabrication.

Figure 7:
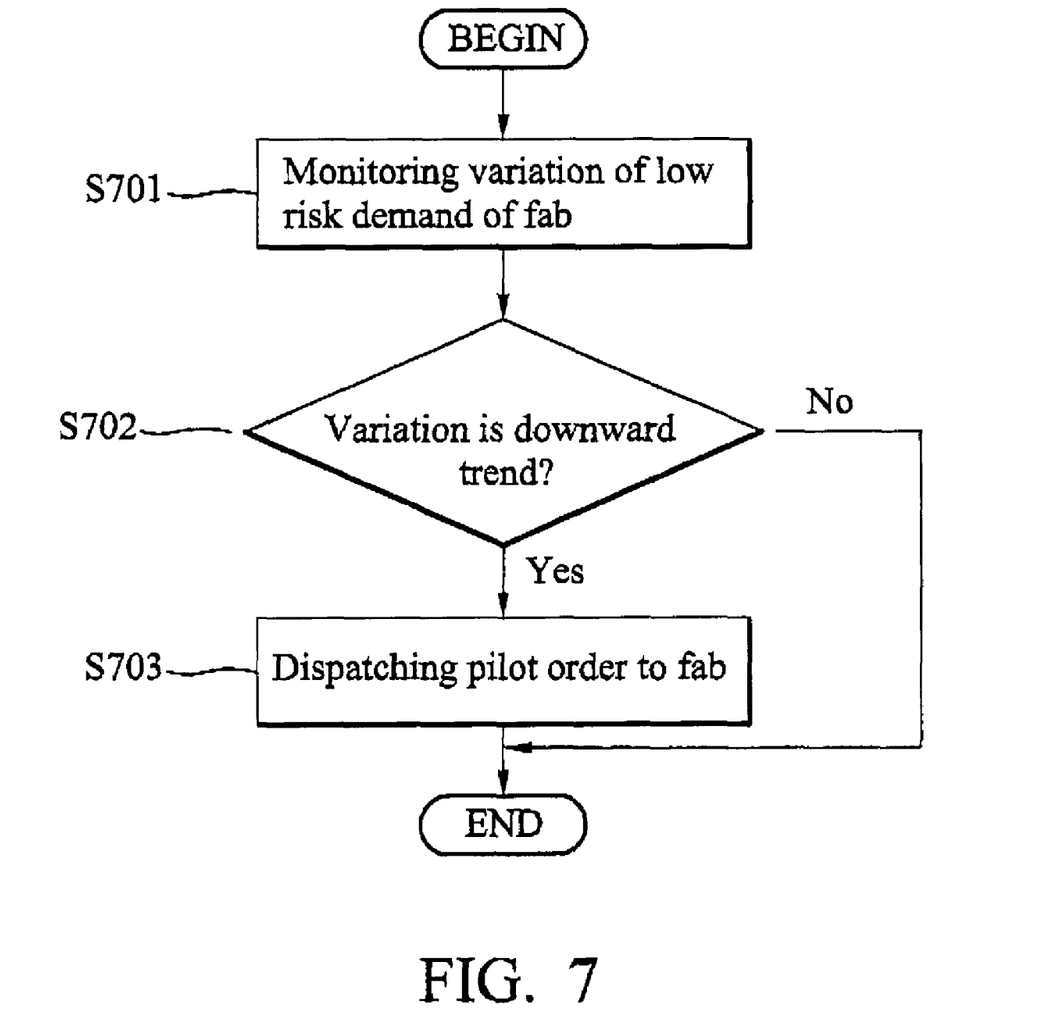
FIG. 7 is a flowchart of a process of long-term demand adjustment according to the present invention.

FIG. 7 is a flowchart showing the process of long-term demand adjustment according to the present invention. First, in step S701, the allocation planning module 121 may monitor variation in the LRD of the fabrication. Then, in step S702, the allocation planning module 121 checks whether the variation shows a downward trend. If so, in step S703, the allocation planning module 121 dispatches pilot orders to the fabrication.

When the order management module 122 receives a purchase order for the IC product from the customer 111, the production line 124 may prepare a material requirement and manufacture IC products according to the purchase order. Further, after the IC products are manufactured, a delivery unit (not shown in figure) may forward the IC products to the customer 111 or other factories as specified by the customer 111.

As a result, using the demand dispatch system and method according to the present invention, the loading of each fabrication can be kept stable. Thus, the manufacturer can prepare appropriate capacity to meet customer demands, and improve cost management in supply chain management.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A machine-readable storage medium comprising a computer program, which, when executed by a computer, causes a device to perform a demand dispatching method for managing a first fabrication with a production line having a capacity, the method comprises:

receiving a first demand;

providing a risk database recording risk information for a first demand, wherein the risk information comprises a first percentage of a low risk part of the first demand and a second percentage of a high risk part of the first demand, a first order rate for the row risk part, and a second order rate for the high risk part, wherein the high risk part is considered as an overestimated part of the first demand, and the first order rate and the second order rate are the possibility of the low risk part and the high risk part to become actual order, respectively;

dividing the first demand into a low risk demand and a high risk demand according to the first percentage of the low risk part and the second percentage of the high risk part, wherein the low risk demand is obtained by multiplying the first demand by the first percentage, and the high risk demand is obtained by multiplying the first demand by the second percentage;

determining an expected quantity of the first fabrication; and managing the capacity of the first fabrication by dispatching portions of the low risk demand and the high risk demand to the first fabrication according to the expected quantity, and the first order rate and the second order rate, thus to allocate the capacity of the first fabrication accordingly, wherein a first quantity of the low risk demand and a second quantity of the high risk demand are dispatched to the first fabrication, the first quantity is less than the amount of the low risk demand, and the second quantity is less than the amount of the high risk demand, and the amount of the first quantity multiplied by the first order rate and the second quantity multiplied by the second order rate is equal to or greater than the expected quantity.

2. The demand storage medium as claimed in claim 1, wherein the step of dispatching the first quantity of the low risk demand and the second quantity of the high risk demand to the first fabrication utilizes a dispatching rule as follows:

$$EQ=FQ*FOR+SQ*SOR,$$

wherein EQ is the expected quantity, FQ is the first quantity, FOR is the first order rate, SQ is the second quantity, and SOR is the second order rate.

3. The storage medium as claimed in claim 1, wherein the method further comprises dispatching a third quantity of the low risk demand of a second demand dispatched to a second fabrication to the first fabrication if the difference between the expected quantity and the first quantity is exceeding a predetermined ratio of the expected quantity, wherein the third quantity of the low risk demand of the second demand dispatched to a second fabrication is not dispatched to the first fabrication and the method steps end if the difference between the expected quantity and the first quantity does not exceed the predetermined ratio of the expected quantity.

4. The storage medium as claimed in claim 3, wherein the method further comprises dispatching a remnant quantity of the high risk demand of the first demand to the second fabrication.

5. The storage medium as claimed in claim 3, wherein the method further comprises the steps of:

monitoring the variation in the first quantity of the low risk demand of the first fabrication; and dispatching a pilot order to the first fabrication if the variation in the first quantity of the low risk demand shows a downward trend, wherein the method steps end when the variation in the first Quantity of the low risk demand does not show a downward trend.

6. A machine-readable storage medium comprising a computer program, which, when executed by a computer, causes a device to perform a demand dispatching method for managing an integrated circuit foundry comprising a first fabrication with a production line having a capacity, the method comprises:

receiving a first demand for a first integrated circuit product;

providing a risk database recording risk information for a first demand, wherein the risk information comprises a first percentage of a low risk part of the first demand and a second percentage of a high risk part of the first demand, a first order rate for the row risk part, and a second order rate for the high risk part, wherein the high risk part is considered as an overestimated part of the first demand, and the first order rate and the second order rate are the possibility of the low risk part and the high risk part to become actual order, respectively;

dividing the first demand into a low risk demand and a high risk demand according to the first percentage of the low risk part and the second percentage of the high risk part, wherein the low risk demand is obtained by multiplying the first demand by the first percentage, and the high risk demand is obtained by multiplying the first demand by the second percentage;

determining an expected quantity of the first fabrication; and managing the capacity of the first fabrication by dispatching portions of the low risk demand and the high risk demand to the first fabrication according to the expected quantity, and the first order rate and the second order rate, thus to allocate the capacity of the first fabrication accordingly, wherein a first quantity of the low risk demand and a second quantity of the high risk demand are dispatched to the first fabrication, the first quantity is less than the amount of the low risk demand, and the second quantity is less than the amount of the high risk demand, and the amount of the first quantity multiplied by the first order rate and the second quantity multiplied by the second order rate is equal to or greater than the expected quantity.

7. The storage medium as claimed in claim 6, wherein the step of dispatching the first quantity of the low risk demand and the second quantity of the high risk demand to the first fabrication utilizes a dispatching rule as follows:

$$EQ=FQ*FOR+SQ*SOR,$$

wherein EQ is the expected quantity, FQ is the first quantity, FOR is the first order rate, SQ is the second quantity, and SOR is the second order rate.

8. The storage medium as claimed in claim 6, wherein the method further comprises dispatching a third quantity of the low risk demand of a second demand for a second integrated circuit product dispatched to a second fabrication to the first fabrication if the difference between the expected quantity and the first quantity is exceeding a predetermined ratio of the expected quantity, wherein the third quantity of the low risk demand of the second demand dispatched to a second fabrication is not dispatched to the first fabrication and the method steps end if the difference between the expected quantity and the first quantity does not exceed the predetermined ratio of the expected quantity.

9. The storage medium as claimed in claim 8, wherein the method further comprises dispatching a remnant quantity of the high risk demand of the first demand to the second fabrication.

10. The storage medium as claimed in claim 6, wherein the method further comprises the steps of:
monitoring the variation in the first quantity of the low risk demand of the first fabrication; and
dispatching a pilot order for a third integrated circuit product to the first fabrication if the variation in the first quantity of the low risk demand shows a downward trend,
wherein the method steps end when the variation in the first quantity of the low risk demand does not show a downward trend.

11. A machine-readable storage medium comprising a computer program, which, when executed by a computer, causes a device to perform a method of integrated circuit product manufacturing for use in an integrated circuit foundry comprising a first fabrication with a production line having a capacity, the method comprises:
receiving a first demand for a first integrated circuit product;
providing a risk database recording risk information for a first demand, wherein the risk information comprises a first percentage of a low risk part of the first demand and a second percentage of a high risk part of the first demand, a first order rate for the row risk part, and a second order rate for the high risk part, wherein the high risk part is considered as an overestimated part of the first demand, and the first order rate and the second order rate are the possibility of the low risk part and the high risk part to become actual order, respectively;
dividing the first demand into a low risk demand and a high risk demand according to the first percentage of the low risk part and the second percentage of the high risk part, wherein the low risk demand is obtained by multiplying the first demand by the first percentage, and the high risk demand is obtained by multiplying the first demand by the second percentage;
determining an expected quantity of the first fabrication;
managing the capacity of the first fabrication by dispatching portions of the low risk demand and the high risk demand to the first fabrication according to the expected quantity, and the first order rate and the second order rate, thus to allocate the capacity of the first fabrication accordingly, wherein a first quantity of the low risk demand and a second quantity of the high risk demand are dispatched to the first fabrication, the first quantity is less than the amount of the low risk demand, and the second quantity is less than the amount of the high risk demand, and the amount of the first quantity multiplied by the first order rate and the second quantity multiplied by the second order rate is equal to or greater than the expected quantity;
receiving a purchase order for the first integrated circuit product; and
manufacturing the first integrated circuit product corresponding to the purchase order in the first fabrication.

12. The storage medium as claimed in claim 11, wherein the step of dispatching the first quantity of the low risk demand and the second quantity of the high risk demand to the first fabrication utilizes a dispatching rule as follows:

$$EQ=FQ*FOR+SQ*SOR,$$

wherein EQ is the expected quantity, FQ is the first quantity, FOR is the first order rate, SQ is the second quantity, and SOR is the second order rate.

13. The method of integrated circuit product storage medium as claimed in claim 11, wherein the method further comprises dispatching a third quantity of the low risk demand of a second demand for a second integrated circuit product dispatched to a second fabrication to the first fabrication if the difference between the expected quantity and the first quantity is exceeding a predetermined ratio of the expected quantity, wherein the third quantity of the low risk demand of the second demand dispatched to a second fabrication is not dispatched to the first fabrication and the method steps end if the difference between the expected quantity and the first quantity does not exceed the predetermined ratio of the expected quantity.

14. The storage medium as claimed in claim 13, wherein the method further comprises dispatching a remnant quantity of the high risk demand of the first demand to the second fabrication.

15. The storage medium as claimed in claim 11, wherein the method further comprises the steps of:
monitoring the variation in the first quantity of the low risk demand of the first fabrication; and
dispatching a pilot order for a third integrated circuit product to the first fabrication if the variation in the first quantity of the low risk demand shows a downward trend,
wherein the method steps end when the variation in the first Quantity of the low risk demand does not show a downward trend.

16. A demand dispatch system, comprising:
a storage device storing a risk database recording risk information for a first demand, wherein the risk information comprises a first percentage of a low risk part of the first demand and a second percentage of a high risk part of the first demand, a first order rate for the row risk part, and a second order rate for the high risk part, wherein the high risk part is considered as an overestimated part of the first demand, and the first order rate and the second order rate are the possibility of the low risk part and the high risk part to become actual order, respectively; and
a processor for executing an allocation planning module, herein the allocation planning module receives a first demand, divides the first demand into a low risk demand and a high risk demand according to the first percentage of the low risk part and the second percentage of the high risk part, wherein the low risk demand is obtained by multiplying the first demand by the first percentage, and the high risk demand is obtained by multiplying the first demand by the second percentage, determines an expected quantity of a first fabrication, and manages capacity of the first fabrication by dispatching portions of the low risk demand and the high risk demand to the first fabrication according to the expected quantity, and the first order rate and the second order rate, thus to allocate the capacity of the first fabrication accordingly, wherein a first quantity of the low risk demand and a second quantity of the high risk demand are dispatched to the first fabrication, the first quantity is less than the amount of the low risk demand, and the second quantity is less than the amount of the high risk demand, and the amount of the first quantity multiplied by the first order rate and the second quantity multiplied by the second order rate is equal to or greater than the expected quantity.

17. A demand dispatch system, comprising:

a storage device storing a risk database recording risk information for a first demand, wherein the risk information comprises a first percentage of a low risk part of the first demand and a second percentage of a high risk part of the first demand, a first order rate for the row risk part, and a second order rate for the high risk part, wherein the high risk part is considered as an overestimated part of the first demand, and the first order rate and the second order rate are the possibility of the low risk part and the high risk part to become actual order, respectively; and a processor for executing an allocation planning module, wherein the allocation planning module receives a first demand for a first integrated circuit product, divides the first demand into a low risk demand and a high risk demand according to the first percentage of the low risk part and the second percentage of the high risk part, wherein the low risk demand is obtained by multiplying the first demand by the first percentage, and the high risk demand is obtained by multiplying the first demand by the second percentage, determines an expected quantity of a first fabrication, and manages the capacity of the first fabrication by dispatching portions of the low risk demand and the high risk demand to the first fabrication according to the expected quantity, and the first order rate and the second order rate, thus to allocate the capacity of the first fabrication accordingly, wherein a first quantity of the low risk demand and a second quantity of the high risk demand are dispatched to the first fabrication, the first quantity is less than the amount of the low risk demand, and the second quantity is less than the amount of the high risk demand, and the amount of the first quantity multiplied by the first order rate and the second quantity multiplied by the second order rate is equal to or greater than the expected quantity.

18. An integrated circuit product manufacturing system, comprising:

a storage device storing a risk database recording risk information for a first demand, wherein the risk information comprises a first percentage of a low risk part of the first demand and a second percentage of a high risk part of the first demand, a first order rate for the row risk part, and a second order rate for the high risk part, wherein the high risk part is considered as an overestimated part of the first demand, and the first order rate and the second order rate are the possibility of the low risk part and the high risk part to become actual order, respectively;

a processor for executing an allocation planning module, wherein the allocation planning module receives a first demand for a first integrated circuit product, divides the first demand into a low risk demand and a high risk demand according to the first percentage of the low risk part and the second percentage of the high risk part, wherein the low risk demand is obtained by multiplying the first demand by the first percentage, and the high risk demand is obtained by multiplying the first demand by the second percentage, determines an expected quantity of the first fabrication, manages the capacity of the first fabrication by dispatching portions of the low risk demand and the high risk demand to the first fabrication according to the expected quantity, and the first order rate and the second order rate, thus to allocate the capacity of the first fabrication accordingly, wherein a first quantity of the low risk demand and a second quantity of the high risk demand are dispatched to the first fabrication, the first quantity is less than the amount of the low risk demand, and the second quantity is less than the amount of the high risk demand, and the amount of the first quantity multiplied by the first order rate and the second quantity multiplied by the second order rate is equal to or greater than the expected quantity, and receives a purchase order for the first integrated circuit product; and a production line manufacturing the first integrated circuit product corresponding to the purchase order in the first fabrication.

* * * * *